US006655887B2

(12) United States Patent
McDonald (10) Patent No.: US 6,655,887 B2
(45) Date of Patent: Dec. 2, 2003

(54) TIE DOWN ANCHOR DEVICES AND PRODUCTS THEREOF

(76) Inventor: Stewart I. McDonald, 359 W. Arlington Ave., Soldotna, AK (US) 99669

( * ) Notice: Subject to any disclaimer, the term of this patent is extended or adjusted under 35 U.S.C. 154(b) by 0 days.

(21) Appl. No.: 09/805,150

(22) Filed: Mar. 14, 2001

(65) Prior Publication Data

US 2001/0046424 A1 Nov. 29, 2001

Related U.S. Application Data

(60) Provisional application No. 60/200,352, filed on Apr. 28, 2000.

(51) Int. Cl.$^7$ .................................................. B60P 7/08
(52) U.S. Cl. ......................... 410/118; 410/97; 410/117
(58) Field of Search ............................ 410/96, 97, 117, 410/118; 24/16 PB, 298, 301, 302; 248/499; 224/403, 534, 318, 563, 568; 29/238, 243.517; 428/36.1, 36.92, 99, 132, 136, 223

(56) References Cited

U.S. PATENT DOCUMENTS

| | | | |
|---|---|---|---|
| 3,579,641 A | | 5/1971 | Larson |
| 3,745,634 A | | 7/1973 | Vargo |
| 4,253,594 A | | 3/1981 | Parks |
| 4,726,558 A | | 2/1988 | Ozone et al. |
| 4,739,528 A | * | 4/1988 | Allen |
| 4,964,771 A | * | 10/1990 | Callihan ..................... 410/118 |
| 5,111,554 A | | 5/1992 | Sweers |
| 5,448,805 A | | 9/1995 | Allen et al. |
| 5,452,973 A | * | 9/1995 | Arvin ......................... 410/118 |
| 5,601,899 A | * | 2/1997 | Campbell .................... 428/99 |
| 5,688,011 A | | 11/1997 | Gulley |
| 5,763,031 A | | 6/1998 | Huang |
| 5,800,106 A | * | 9/1998 | Miller ......................... 410/117 |
| 5,875,522 A | | 3/1999 | Latal et al. |
| 5,915,899 A | * | 6/1999 | Dennis ........................ 410/36 |
| 6,039,521 A | * | 3/2000 | Sullivan ..................... 410/118 |
| 6,152,664 A | * | 11/2000 | Dew et al. .................. 410/100 |
| 6,345,944 B1 | * | 2/2002 | Florence ..................... 410/118 |
| 6,419,433 B1 | * | 7/2002 | Chou ........................... 410/97 |

* cited by examiner

*Primary Examiner*—Stephen T. Gordon
(74) *Attorney, Agent, or Firm*—Richard C. Litman (57) ABSTRACT

A method for making a tie down anchor strap device and the product thereof. The strap device comprises a rectangular strip of flexible plastic mesh material having a predetermined number of plastic grommets at each end or in spaced groups along the strip. The method comprises making a tie down anchor device with insert injection molding machines to form plastic infused circular regions which are subsequently punched to cut X-shaped openings. One tie down anchor device embodiment is used to secure cargo in the bed of a pickup truck between tie down hooks and racks of various types. A second embodiment provides a doubled anchor strap device. A third embodiment comprises the production of a roll of a tie anchor strip with spaced groups of plastic grommets for edging a tarpaulin sheet.

5 Claims, 7 Drawing Sheets

TIE DOWN ANCHOR DEVICES AND PRODUCTS THEREOF

CROSS-REFERENCE TO RELATED APPLICATION

This application claims the benefit of U.S. Provisional Patent Application Ser. No. 60/200,352, filed Apr. 28, 2000.

BACKGROUND OF THE INVENTION

1. Field of the Invention

The present invention relates to methods for making tie down anchor devices and the products thereof, and more specifically, a flexible tie down anchor strap subjected to insert injection molding to create plastic grommets within a flexible plastic mesh strap which can additionally be used to edge a tarpaulin sheet.

2. Description of Related Art

Adjustable strap type fastening members have many useful applications. A well known and commonly used article for this purpose is a unitary nylon cable tie having an elongated flexible strap portion and an enlarged head portion with an aperture and a retention member protruding into the aperture. There is a need for a fast and secure tie down anchor strap device between a tie down hook and rack or between other applicable tie down locations. The tie down strap with integrated plastic grommets can be utilized to edge a tarpaulin sheet.

The following patents describe various types of methods and devices for securing objects to a fixed location.

U.S. Pat. No. 3,579,641, issued to Wesley S. Larson on May 25, 1971, describes an end clip for a load carrying belt. The end clip has prongs formed on an outer surface, and the prongs are releasably engageable with eyelets in the belt forming a loop.

U.S. Pat. No. 3,745,634, issued to William J. Vargo on Jul. 17, 1973, describes a rubberized metal reinforced belt grommet installing machine. The machine is for affixing grommets to rubberized reinforcement belts which have been previously punched with holes for receiving the grommets.

U.S. Pat. No. 4,253,594, issued to Robert P. Parks on Mar. 3, 1981, describes an anchor strap. The strap includes a frame defining an opening and a swingable member for swinging movement into an opening and closing relation with the strap.

U.S. Pat. No. 4,726,558, issued to Teruyoshi Ozone et al. on Feb. 23, 1988, describes a grommet and grommet retaining member. The method of making a grommet comprises a body member having a shank and fitting recesses for receiving a linear article.

U.S. Pat. No. 5,111,554, issued to Ronald L. Sweers on May 12, 1992, describes a hold-down strap for a tarpaulin. The strap includes an elongated pliable body portion and two end portions fitted into the body portion.

U.S. Pat. No. 5,448,805, issued to Scott R. Allen, et al. on Sep. 12, 1995, describes a vehicle rack strap and combined sleeve hook. The rack strap includes a hook securing arrangement made up of a hook and a sleeve. The sleeve cooperates with the hook to protect the load at the location of the hook and to hinder disengagement of the hook relative to a rack bar.

U.S. Pat. No. 5,688,011, issued to William F. Gulley on Nov. 18, 1997, describes a lifting sling system having a single strap with size-varying, spaced, in-line eye loops. The sling includes a strap of flexible, fabric-like material having looped strap ends.

U.S. Pat. No. 5,763,031, issued to Jerry J. Huang on Jun. 9, 1998, describes a cover reinforcement method and product. The cover includes reinforced regions for attaching grommets. The edges have extra fabric or fill added and stressed crossings between the grommet sites during the weaving process U.S. Pat. No. 5,875,522, issued to James F. Latal on Mar. 2, 1999, describes a grommet and adjustable strap fastener assembly. The assembly includes an elongated strap member having a head portion at a first end in combination with at least one body member having a first strap aperture for receiving the elongated strap member.

None of the above inventions and patents, taken either singly or in combination, is seen to describe the instant invention as claimed.

SUMMARY OF THE INVENTION

The present invention relates to methods for making tie down anchor strap devices and the products made therof. The strap device includes a length of flexible, durable plastic mesh material with a plurality of plastic resin injection molded grommets having X-punched centers. The method includes subjecting the strap of plastic mesh material to an insert injection molding machine, wherein a plurality of plastic grommets will be formed into predetermined circular areas within the material. The plastic resin penetrates into the plastic mesh strap and creates each plastic grommet precursor. The grommet precursor can then be punched to form an X-shaped cut or punched after two straps with identical plastic grommet precursors are snapped together.

Each tie down anchor element is used as a versatile secure tie down anchor element between tie down hooks and racks of various types. Tie down hooks are placed into each plastic grommet utilizing the X-shaped cuts formed by a sharp punch. The tie down anchor device with a number of insert injection molded grommets permits many tie down hooks to be secured from various angles and directions.

Accordingly, it is a principal object of the invention to provide a tie down anchor device that is fast and easy to operate for securing tie down hooks to racks of various types.

It is another object of the invention to provide a tie down anchor device with a number of insert injection molded grommets to permit many tie down hooks to be secured from various angles and directions.

It is a further object of the invention to provide a tie down anchor that includes an X-shaped cut in the center of each plastic grommet for additional securing of each tie down hook within each grommet.

Still another object of the invention is to provide a tie down strap having multiple plastic grommets in roll form to edge a tarpaulin sheet that secures loads without damaging expensive racks.

It is an object of the invention to provide improved elements and arrangements thereof an apparatus and method for making tie down anchors in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A first embodiment of the present invention relates to a product and method for making a basic tie down anchor strap device 10 illustrated in FIGS. 1 to 5. The strap device 10 comprises generally a strip of flexible plastic mesh material 12 having infused therein a plurality of plastic resin injected molded grommets 14. The method of making a tie down anchor device 10 includes five process steps.

Figure 1:
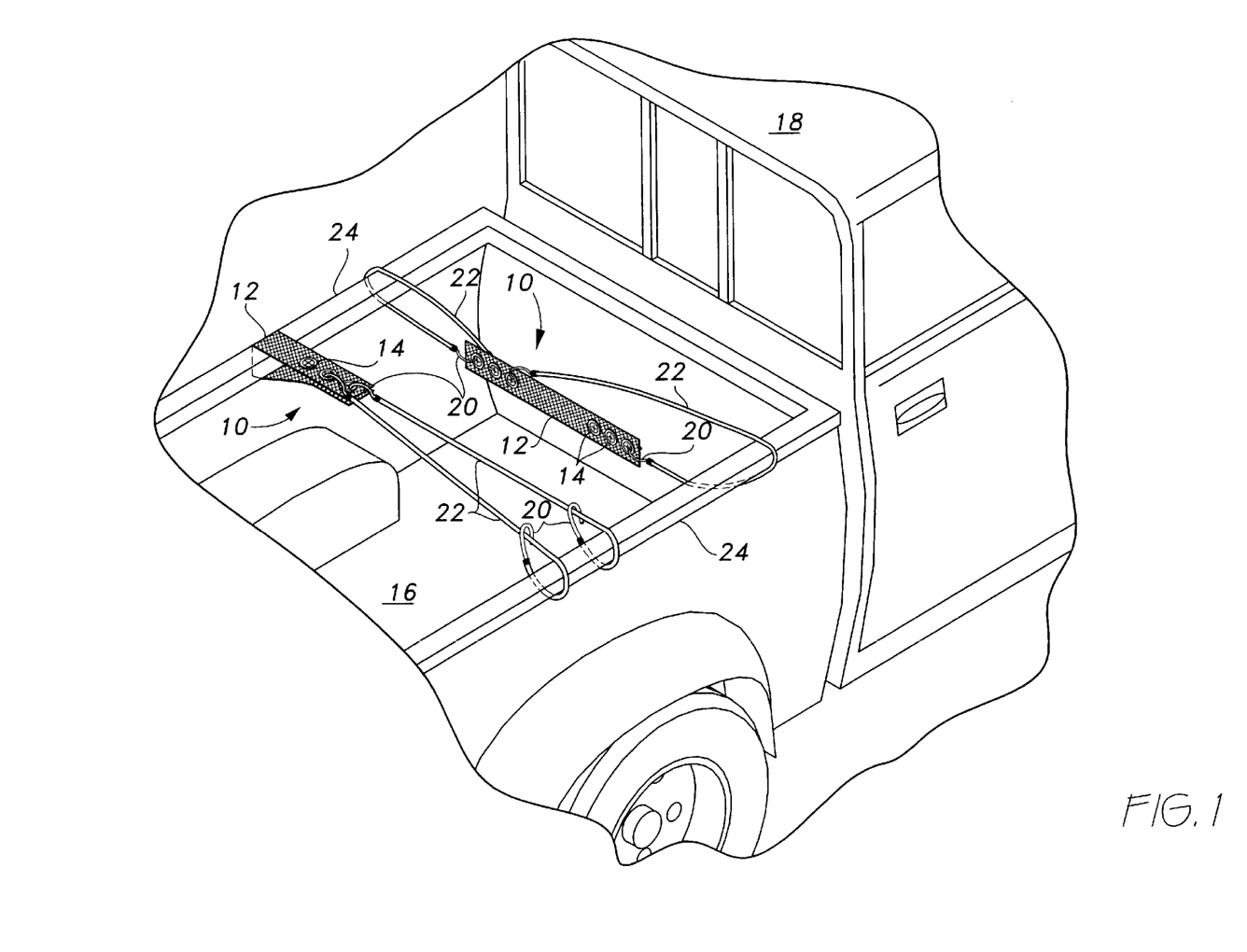
FIG. 1 is an environmental, perspective view of the operation of two tie down anchor devices being used to hold down an item in the bed of a truck according to the present invention.

FIG. 1 illustrates the operation of two tie down anchor strap devices 10 utilized on the bed 16 of a pickup truck 18 with the cargo omitted. The present invention is used as a quick, efficient method of securing the tie down anchor strap devices 10 by tie down hooks 20 at the ends of bungee cords 22 to racks or rails 24. The tie down anchor strap device 10 will allow for a trouble free anchor point for a tie down hook 20 to be secured. Each tie down anchor device 10 can be used in a variety of ways to complete many tie down needs as depicted in FIG. 1. The tie down anchor strap device 10 has at least three grommets 14 grouped at the opposite end.

The second tie down anchor strap device 12 wrapped around the left rail 24 has the visible grommets 14 covering the hidden corresponding grommets. It should be noted that the number of grommets in a group or the spacing between grommets is not critical but dependent on the needs of a particular user. However, the number and spacing of the grommets must coincide as when the second strap device 10 is doubled as shown with the bungee cords 22 wrapped around the rails 24. It is also contemplated that other bungee cords 22 can be hooked into unoccupied grommets 14 of a tie down anchor strap device 10 to be secured from many angles and directions such as connecting the two strap devices 10.

The tie down hooks 20 are secured in each plastic grommet 14 which has an X-shaped cut 26 formed by a sharp punch (not shown). The X-shape is actually two straight lines perpendicular to and bisecting each other. It has been found that this cut configuration provides adequate penetration and grip of a hook 20 in the plastic grommet 14 while avoiding deleterious enlargement of the grommet 14 commensurate to that of a metal grommet due to the peripheral saturation of plastic in the plastic mesh strip 12.

Figure 2:
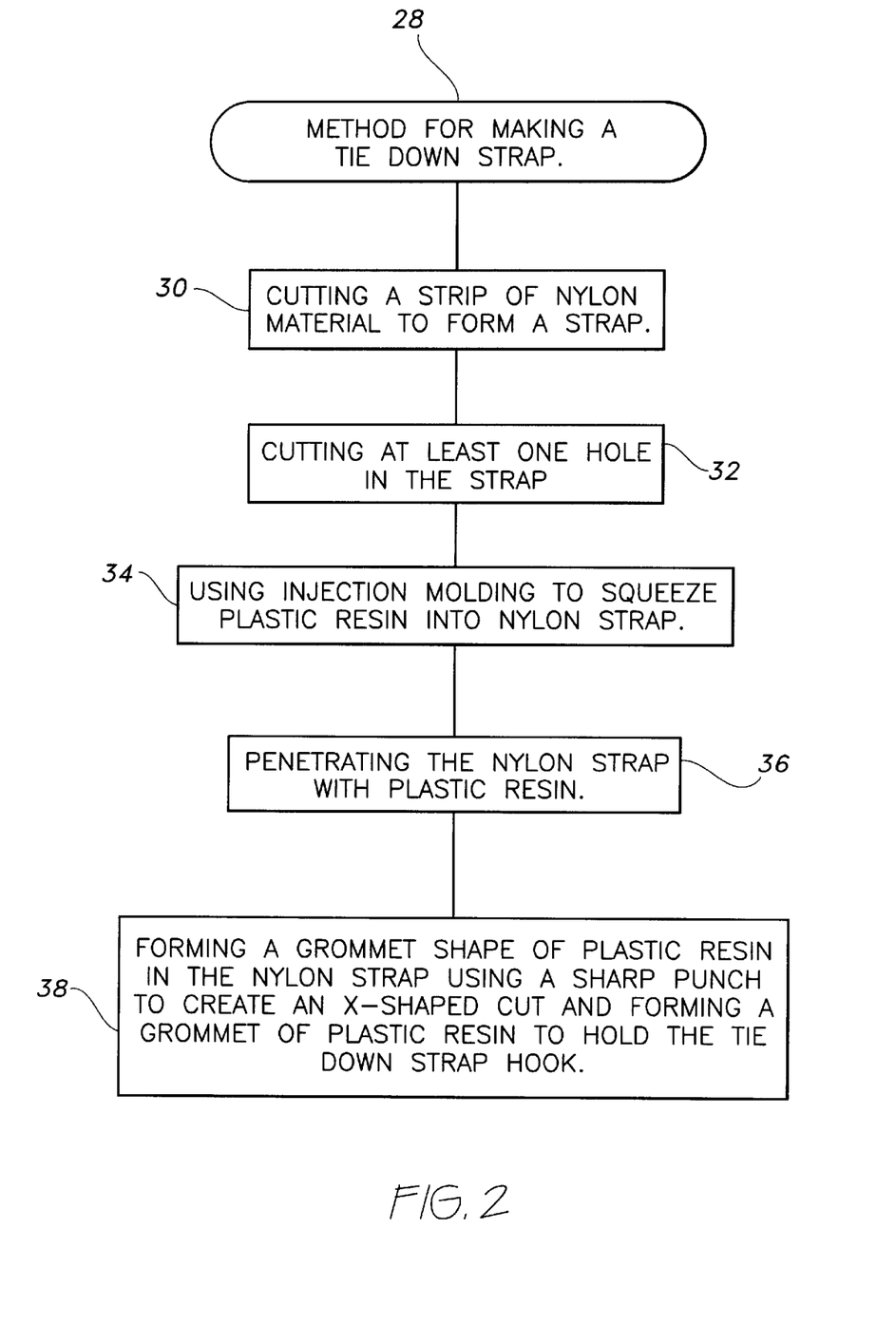
FIG. 2 is a flow chart illustrating the method of making the first embodiment of the present invention in which a tie down anchor device is manufactured.
Figure 3:
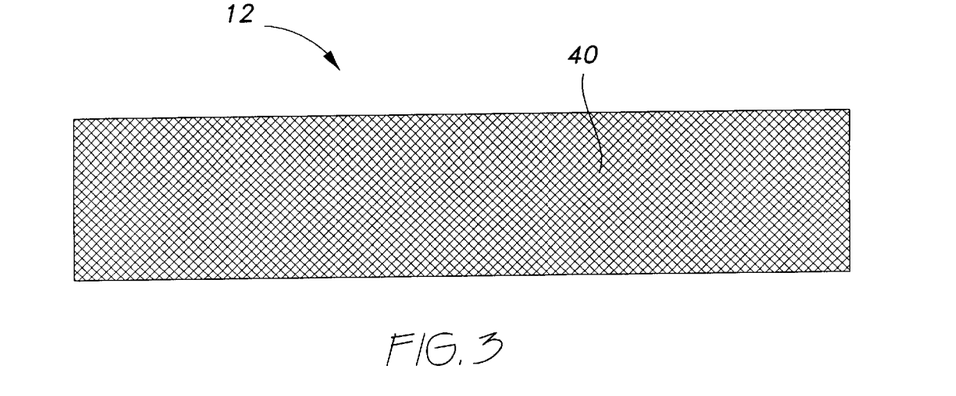
FIG. 3 is a top plan view of the first embodiment of the present invention, wherein the tie down anchor strap is shown before it is subjected to insert injection molding.
Figure 4:
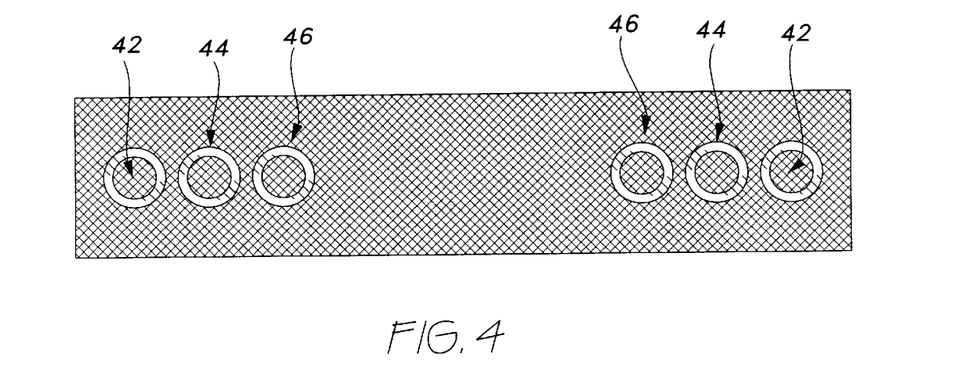
FIG. 4 is a top plan view of the first embodiment of the present invention, wherein the tie down anchor strap is shown after it has been subjected to insert injection molding.
Figure 5:
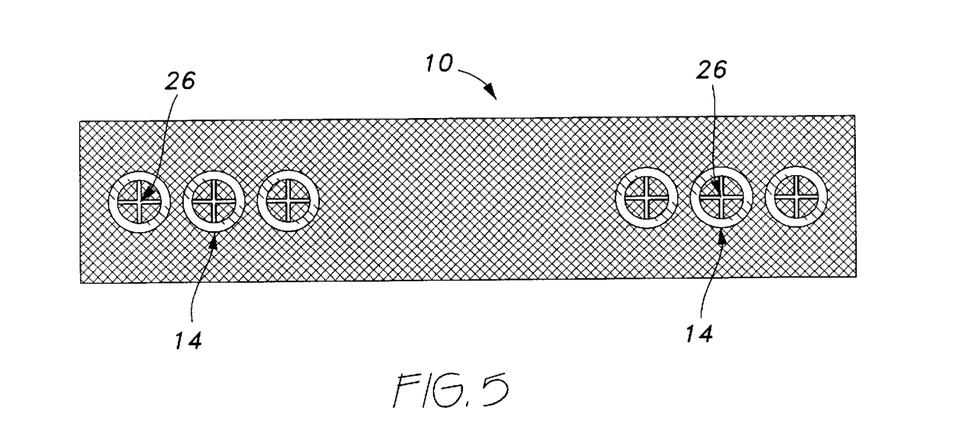
FIG. 5 is a top plan view of the first embodiment of the present invention, wherein the tie down anchor strap is shown after it has been cut by a sharp punch creating X-shaped cuts.

FIG. 2 demonstrates a method 28 for making a tie down anchor strap device 10 of the first embodiment with reference to FIGS. 3 to 5. A conventional insert injection molding apparatus is utilized in creating the plastic grommets 14. In a first process step 30, a length of nylon mesh material 40 (FIG. 3) will be cut in the form of a strap 12 of a predetermined length, and dimensioned depending on the purpose intended. The nylon strap 12 is preferably twelve to eighteen inches in length. In a second process step 32, a plurality of holes 42 are cut at each end of the strap 12. Alternatively, the first and second process steps can be performed simultaneously by the injection mold apparatus. Preferably, the strap 12 will be cut in length and holes 42 formed as shown in FIGS. 3 to 5 by a two-piece steel mold press having circular guide pins to form the holes 42 and the circular ridges 44 (FIG. 4) for the grommets 14. The preferred type of starting material used would be a nylon mesh, but any flexible, stretchable and durable material such as polyethylene, polypropylene, polyester, and the like plastic resin material will suffice. In a third process step 34, the strap 12 will be subjected to an insert injection of the plastic resin melt only in the region of the holes 42 such as from a side of the mold. In a fourth process step 36, the hot plastic resin penetrates the periphery of a hole 42 to form a plurality of plastic grommet precursor elements 46 (FIG. 4) in the strap 12.

In the fifth and final process step 38, the strap 12 is removed from the mold while still warm, and an X-shaped cut 26 is made by a sharp punch to form a plastic grommet 14 having a unique locking configuration centered inside each plastic grommet precursor 46 (FIG. 5). Preferably, a plastic grommet 14 will be spaced approximately an inch from an end of a strap 12 which is 1.5 inches wide and 12 to 16 inches in length. The grommets 14 in a group are spaced approximately 1.25 inches apart based on center to center distance. A group of three grommets are preferably spaced approximately 4 to 8 inches apart based on the length of the strap 12. The holes 42 are approximately 0.75 inch in diameter.

It is within the ambit of the present invention to construct grommet 14 in a variety of shapes and sizes, but a small circular shape is the preferred dimension.

Using the method of fast forming insert injection molds with the subsequent X-shaped cutting punching step, the tie down strap or anchor device 10 can be fabricated with automation and made with less expensive materials.

Normally, a tie strap is made by cutting a hole in the strap and using a metal grommet. However, by subjecting the body of material to insert injection molding to create a plastic grommet, the integrity of the nylon strap is largely preserved. The actual dimensions will vary in terms of the size of the grommets and specifications of the body of material.

One tie down strap device 10 will anchor multiple tie down hooks 22 as depicted in FIG. 1. The tie down strap devices 10 can secure loads without damaging expensive racks 24. A longer embodiment of the tie down strap device 10 can be used to secure hooked tie downs around boat trailer frames and ATV's. Larger tie down strap devices 10 can be made to handle a variety of tie down hooks 22 sizes to complete many tie down needs.

Figure 6:
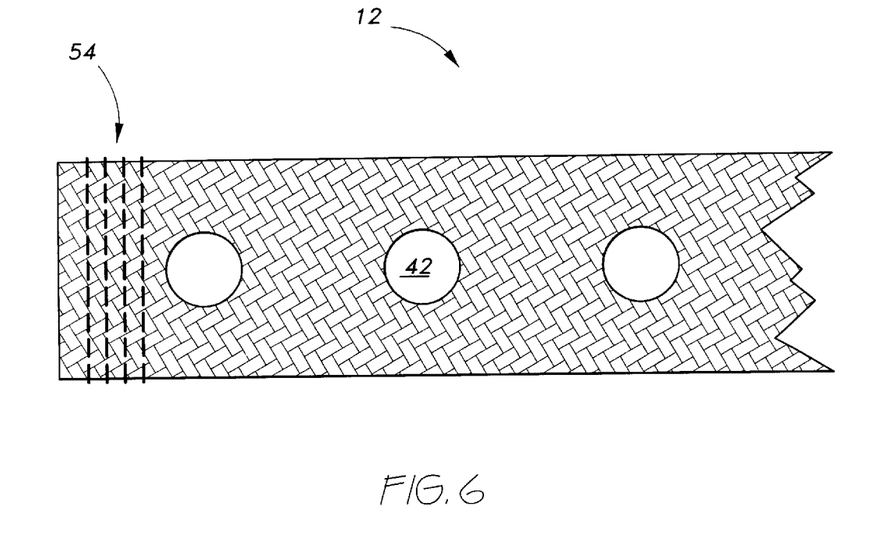
FIG. 6 is a top plan view of a second embodiment of the present invention of a pair of snapped together straps, wherein a first process step of forming apertures in each strap having a reinforced end is illustrated with only one strap.
Figure 7:
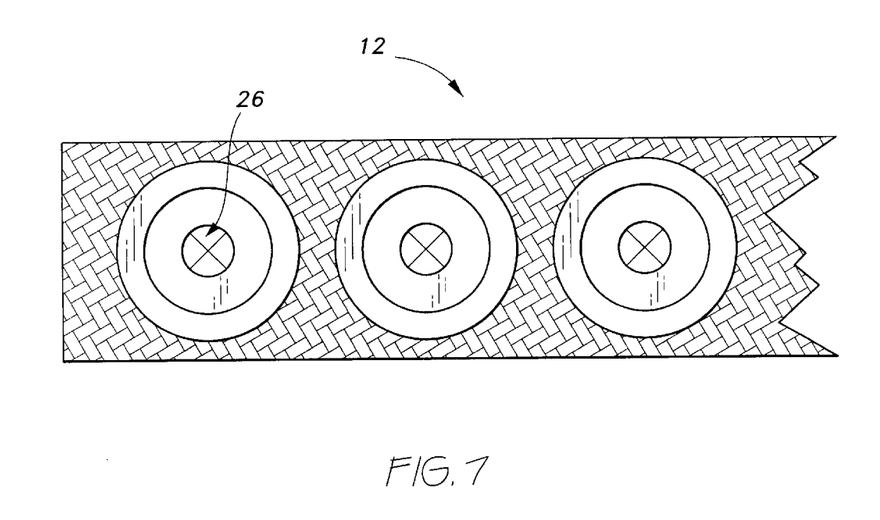
FIG. 7 is a top plan view of the second embodiment of the present invention, wherein one strap having a plastic grommet is formed with an X-shaped opening.
Figure 8:
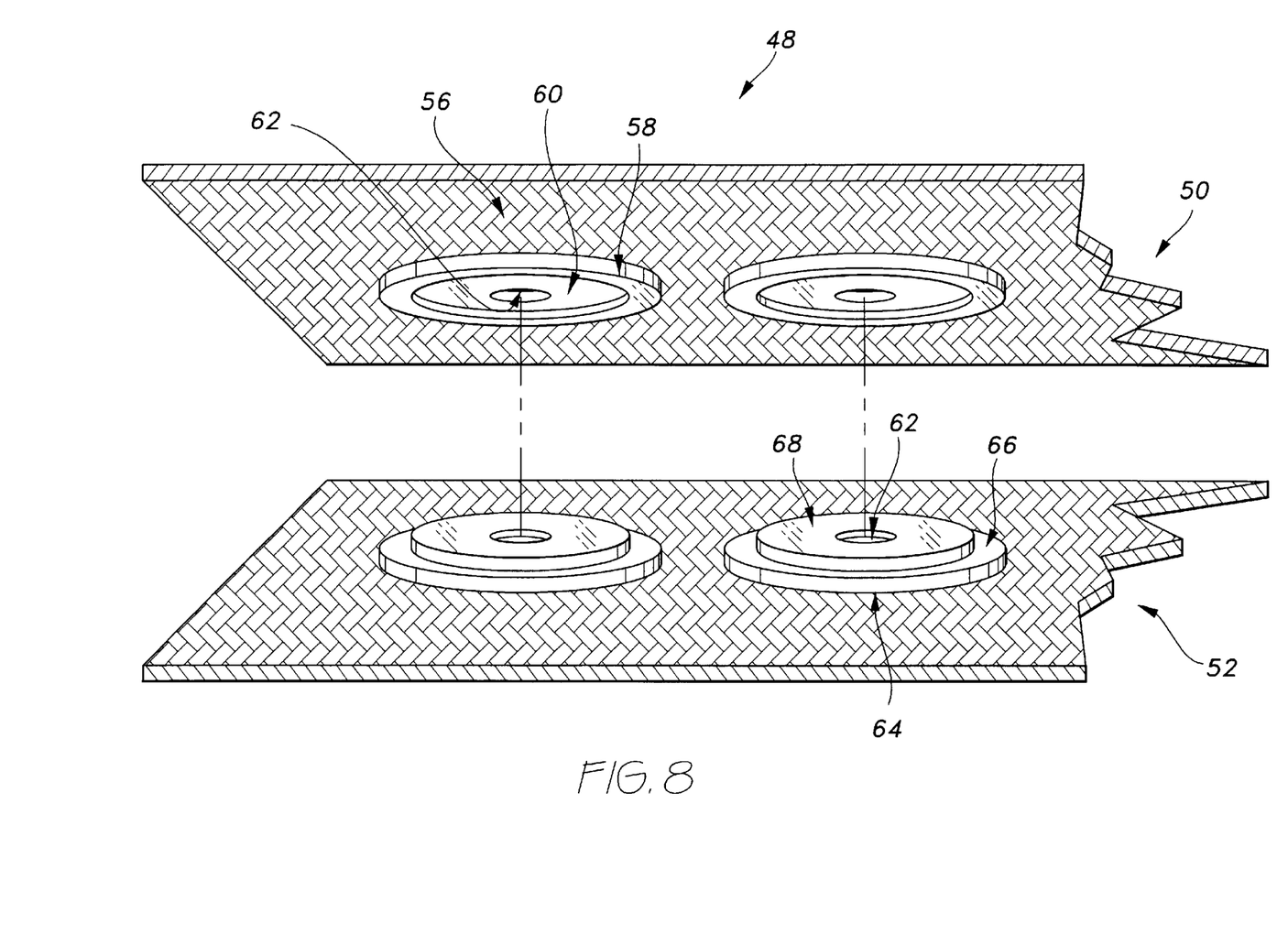
FIG. 8 is a perspective view of the second embodiment of the present invention with two straps having male and female grommet halves prior to joining.

FIGS. 6 through 8 are drawn to the second embodiment based on a pair 48 of snapped together straps 50 (upper) and 52 (lower) shown in (FIG. 8) made from plastic mesh straps 12 having a series of binder strands 54 cross woven in the ends of a strap 12 for security against unraveling (FIG. 6 only). In this embodiment, the group of three holes 42 are made initially by the mold pins, but by two different molds in separate process steps. In FIG. 7, the top strap 50 and the bottom strap 52 have identical circular patterns as viewed in plan view, but differ in the actual positions of the ridges as shown in FIG. 8 to form a male and female configuration similar to a snap device. In FIG. 7, as the molds are pressed together, the hot plastic melt is injected into the cut regions or holes 42 to saturate the peripheries of the holes and form the ridges and a central membrane. Subsequently, the X-shaped cut 26 is made by a punch upon solidification of the plastic melt. The top strap 50 in FIG. 8 has a grommet 56 having a peripheral ridge 58, a flattened region 60 ($\frac{1}{32}$ inch thick) enclosed by the ridge 58, and a central circular membrane 62 which has the X-shaped cut 26 (FIG. 7). The bottom strap 52 has a grommet 64 having a peripheral ledge 66 commensurate in area to match the peripheral ridge 58 of the top grommet 56. A circular ridge 68 is enclosed by the peripheral ledge 66, and includes a central circular membrane 62 having another X-shaped cut 26 identical in area to that in the top grommet 56. Thus, this embodiment enables the attachment of the straps 50 and 52 by pressing the respective grommets 56 and 64 together and aligning the X-shaped cuts 26 analogous to a snap arrangement. Alternatively, the X-shaped cuts 26 can be made by a punch after the straps 50 and 52 are joined. The straps 50 and 52 can then be utilized on a rack or rail. The X-shaped cuts 26 in this embodiment are in a center hole $\frac{7}{16}$ inch in diameter. The inner circle which is either raised or sunk has a diameter of $\frac{3}{4}$ inch. The outer circle which is either raised or sunk has a diameter of $1\frac{1}{8}$ inches.

Figure 9:
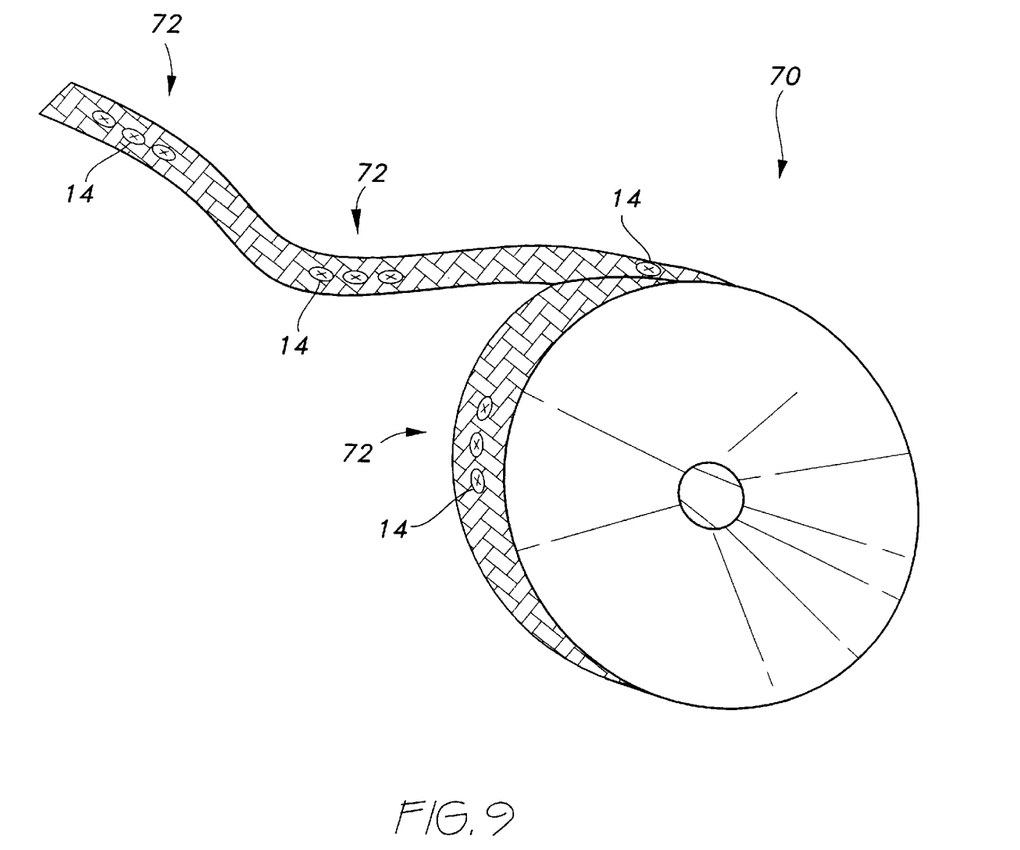
FIG. 9 is a perspective view of a roll of strap webbing having a series of plastic injected grommets as a third embodiment.
Figure 10:
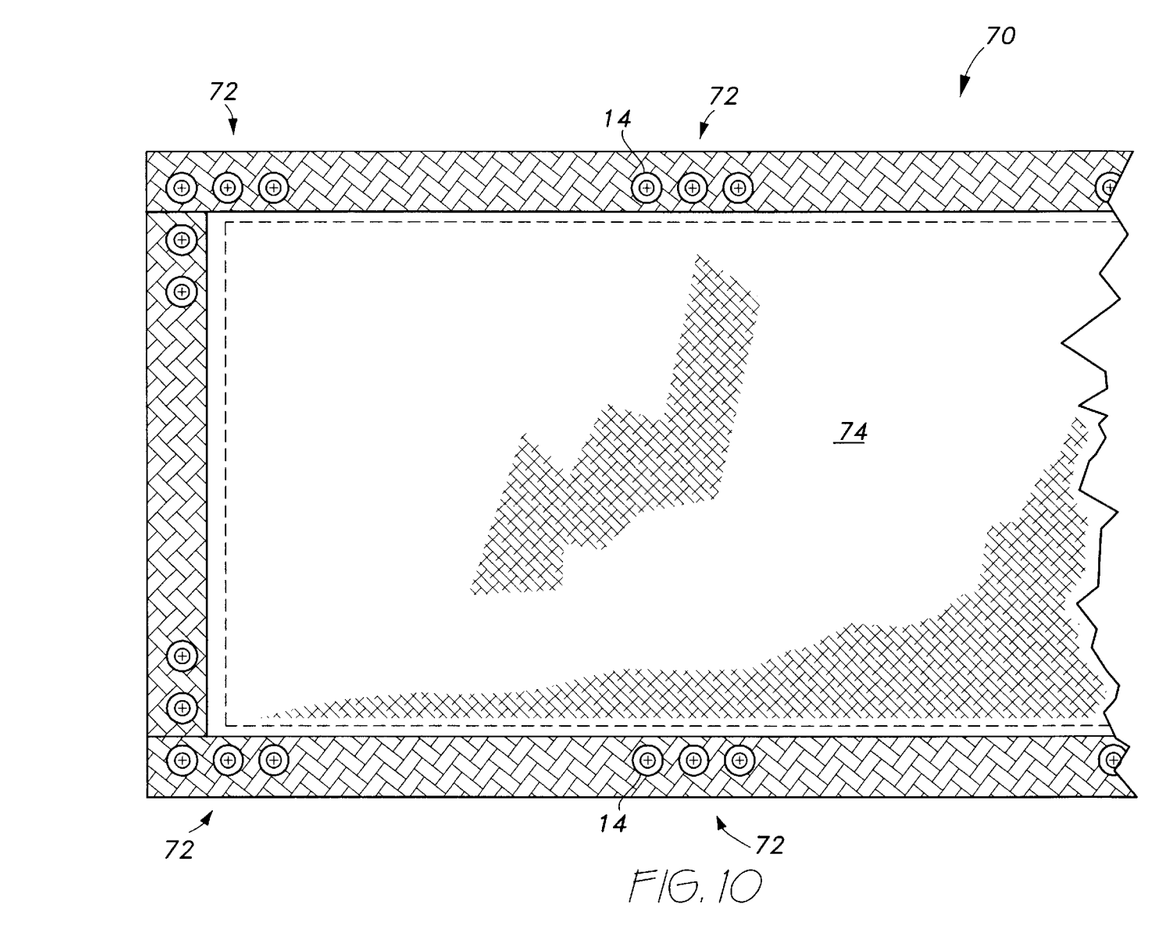
FIG. 10 is a top plan view of the third embodiment strap webbing utilized to edge a tarpaulin sheet partially shown.

FIGS. 9 and 10 are drawn to a third embodiment involving the use of a rolled up strap webbing 70 having spaced groups 72 of grommets 14 for edging a tarpaulin sheet 74.

Thus, the versatility and usefulness of the present invention to form plastic gommeted straps for tying down goods in a bed of a pickup truck and the like has been shown.

It is to be understood that the present invention is not limited to the sole embodiments described above, but encompasses any and all embodiments within the scope of the following claims.

I claim:
1. A method for making a tie down anchor strap device comprising the steps of:
    (a) cutting a length of a rectangular strip of flexible plastic web material;
    (b) insert injection molding by an injection molding element to infuse synthetic resin material into predetermined circular regions in the web material; and
    (c) cutting an X-shape in a grommet of synthetic resin in the web material with a sharp punch to create an X-shaped cut to form a tie down anchor strap device.
2. The method according to claim 1, including the simultaneous cutting of the length of flexible plastic web material and cutting of the predetermined circular regions in the web material by the injection molding element.
3. The method according to claim 1, including the steps of forming a continuous strip of the tie down anchor strap device, and forming a roll of the continuous strip.
4. The method according to claim 1, wherein said plastic web material and infused synthetic resin material are selected from the group consisting of nylon, polyethylene, polypropylene, and polyester.
5. The method according to claim 1, wherein said plastic web material and infused synthetic resin material are nylon.

* * * * *